US008261362B2

(12) United States Patent  (10) Patent No.: US 8,261,362 B2
Goodwin et al.  (45) Date of Patent: Sep. 4, 2012

(54) ONLINE PRIVACY MANAGEMENT

(75) Inventors: Joshua C. Goodwin, Mountain View, CA (US); Joshua R. Manion, Los Altos, CA (US)

(73) Assignee: Ensighten, Inc., Cupertino, CA (US)

( * ) Notice: Subject to any disclaimer, the term of this patent is extended or adjusted under 35 U.S.C. 154(b) by 0 days.

(21) Appl. No.: 13/340,582

(22) Filed: Dec. 29, 2011

(65) Prior Publication Data

US 2012/0174236 A1 Jul. 5, 2012

Related U.S. Application Data

(60) Provisional application No. 61/428,560, filed on Dec. 30, 2010.

(51) Int. Cl.
*G06F 7/00* (2006.01)
(52) U.S. Cl. ......................................................... 726/27
(58) Field of Classification Search ................... 726/27; 707/705–788, 607–609
See application file for complete search history.

(56) References Cited

U.S. PATENT DOCUMENTS

| 6,487,604 | B1 | 11/2002 | Rochford et al. |
| 6,535,912 | B1* | 3/2003 | Anupam et al. ............. 709/217 |
| 6,633,312 | B1 | 10/2003 | Rochford et al. |
| 6,654,803 | B1 | 11/2003 | Rochford et al. |
| 6,691,282 | B1 | 2/2004 | Rochford et al. |
| 7,389,343 | B2 | 6/2008 | Busch et al. |
| 7,584,435 | B2 | 9/2009 | Bailey et al. |
| 7,614,002 | B2 | 11/2009 | Goldfeder et al. |
| 7,689,665 | B2* | 3/2010 | Lipton et al. ................. 709/217 |
| 7,885,942 | B2 | 2/2011 | Chand et al. |
| 7,890,451 | B2 | 2/2011 | Cancel et al. |
| 7,941,394 | B2 | 5/2011 | Error |
| 2002/0143770 | A1* | 10/2002 | Schran et al. .................. 707/10 |
| 2003/0097421 | A1 | 5/2003 | Wille et al. |
| 2003/0154442 | A1 | 8/2003 | Papierniak |
| 2007/0011304 | A1 | 1/2007 | Error |
| 2007/0112856 | A1 | 5/2007 | Schram et al. |
| 2007/0288247 | A1 | 12/2007 | Mackay |
| 2007/0299743 | A1 | 12/2007 | Staib et al. |
| 2007/0299964 | A1 | 12/2007 | Wong et al. |
| 2008/0040473 | A1 | 2/2008 | Larsson et al. |
| 2008/0052278 | A1 | 2/2008 | Zlotin et al. |

(Continued)

FOREIGN PATENT DOCUMENTS

EP  1105790 A1  6/2001

(Continued)

OTHER PUBLICATIONS

Peterson, Eric T., "The Coming Revolution in Web Analytics," copyright 2009, pp. 1-18, SAS Institute Inc.

(Continued)

*Primary Examiner* — Edward Zee
*Assistant Examiner* — Sayed Beheshti Shirazi
(74) *Attorney, Agent, or Firm* — Banner & Witcoff, Ltd.

(57) ABSTRACT

A privacy management system (PMS) is disclosed for a Chief Privacy Officer (CPO) or other user to use in monitoring and/or controlling in realtime the flow of data (e.g., outflow) about the user and his/her online experience. The PMS may provide a dashboard displaying a whitelist and/or blacklist indicating what destinations/sources are blocked or allowed. The PMS includes browser-client scripting code and may also include a PMS-certified verification icon for display on webpages being monitored/controlled in realtime by the PMS.

14 Claims, 9 Drawing Sheets

U.S. PATENT DOCUMENTS

| | | | |
|---|---|---|---|
| 2008/0086454 A1 | 4/2008 | Bahadori et al. | |
| 2008/0183858 A1 | 7/2008 | Error | |
| 2008/0184116 A1 | 7/2008 | Error | |
| 2008/0189281 A1 | 8/2008 | Cancel et al. | |
| 2008/0201242 A1 | 8/2008 | Minnis et al. | |
| 2008/0201643 A1 | 8/2008 | Nagaitis et al. | |
| 2008/0228819 A1 | 9/2008 | Minnis et al. | |
| 2008/0256622 A1 | 10/2008 | Neystadt et al. | |
| 2008/0270471 A1 | 10/2008 | Schon | |
| 2009/0024748 A1 | 1/2009 | Goldspink et al. | |
| 2009/0100139 A1 | 4/2009 | Purdy et al. | |
| 2009/0100154 A1 | 4/2009 | Stevenson et al. | |
| 2009/0112918 A1 | 4/2009 | Terrell | |
| 2009/0150539 A1 | 6/2009 | Epling | |
| 2009/0182718 A1 | 7/2009 | Waciawik et al. | |
| 2009/0193497 A1* | 7/2009 | Kikuchi et al. | 726/1 |
| 2009/0204478 A1 | 8/2009 | Kaib et al. | |
| 2009/0248484 A1 | 10/2009 | Surendran et al. | |
| 2009/0254511 A1 | 10/2009 | Yeap et al. | |
| 2009/0287713 A1 | 11/2009 | Anderson et al. | |
| 2009/0292677 A1 | 11/2009 | Kim | |
| 2009/0327296 A1 | 12/2009 | Francis et al. | |
| 2009/0327353 A1 | 12/2009 | Zhuge et al. | |
| 2010/0017384 A1 | 1/2010 | Marinescu | |
| 2010/0023999 A1* | 1/2010 | Schran et al. | 726/1 |
| 2010/0030894 A1 | 2/2010 | Cancel et al. | |
| 2010/0049627 A1 | 2/2010 | Geppert et al. | |
| 2010/0131585 A1* | 5/2010 | Rodrigue et al. | 709/203 |
| 2010/0205523 A1* | 8/2010 | Lehota et al. | 715/235 |
| 2010/0235494 A1 | 9/2010 | Sood et al. | |
| 2010/0251128 A1 | 9/2010 | Cordasco | |
| 2010/0281389 A1 | 11/2010 | Hutchinson | |
| 2010/0318976 A1 | 12/2010 | Everly et al. | |
| 2010/0332962 A1* | 12/2010 | Hammer et al. | 715/205 |
| 2011/0035486 A1 | 2/2011 | Seolas et al. | |
| 2012/0042009 A1* | 2/2012 | Schran et al. | 709/203 |

FOREIGN PATENT DOCUMENTS

| | | |
|---|---|---|
| EP | 1108309 A1 | 6/2001 |
| EP | 1108312 A1 | 6/2001 |
| EP | 1145167 A2 | 10/2001 |
| EP | 1264261 B1 | 11/2005 |
| EP | 1997041 A1 | 12/2008 |
| EP | 1094635 B1 | 8/2009 |
| EP | 2141614 | 1/2010 |
| EP | 2199969 | 6/2010 |
| GB | 2412805 A | 10/2005 |
| WO | 0079374 A1 | 12/2000 |
| WO | 0103374 A1 | 1/2001 |
| WO | 0103378 A1 | 1/2001 |
| WO | 0103023 A3 | 8/2001 |
| WO | 2008024706 | 2/2008 |
| WO | 2008137522 | 11/2008 |
| WO | 2010119379 | 10/2010 |
| WO | 2011084843 | 7/2011 |

OTHER PUBLICATIONS

Manion, Josh, "Data Collection Part 1-Single Methodologies," retrieved Nov. 6, 2009, pp. 1-3, Stratigent, LLC.
Resig, John. Website: www.ejohn.org, retrieved Feb. 18, 2010.
Website: www.tealium.com, retrieved Jan. 26, 2010.
Website: www.monetate.com, retrieved Feb. 22, 2010.
Website: www.speed-trap.com, retrieved Jan. 26, 2010.
Website: www.tagman.com, retrieved Jan. 26, 2010.
Website: www.sitetagger.co.uk, retrieved Jan. 26, 2010.
Crockford, Douglas, "The JavaScript Minifier," Dec. 4, 2003, pp. 1-2, website: http://www.crockford.com/javascript/jsmin.html.
Crockford, Douglas, "PHP Adaptation of JSMin" JSMIN_lib.pho (for PHP 4, 5), retrieved on Jan. 26, 2010, pp. 1-10, website: http://javascript.crockford.com/jsmin2.php.txt.
Website: http://developer.yahoo.com/yui/, on Feb. 18, 2010, pp. 1-2.
Website: www.dojotoolkit.org, retrieved Feb. 22, 2010, p. 1.
Website: http://download.dojotoolkit.org/release-1.4.0/dojo.js.uncompressed.js, retrieved Feb. 22, 2010.
Website: www.code.google.com/p/jquelyjs/downloads/detail?name=jquery-1.3.2.js, retrieved Jan. 26, 2010.
Website: www.jquery.com, retrieved Jan. 26, 2010, pp. 1-2.
Website: www.magiq.com, retrieved Feb. 22, 2010, pp. 1.
International Search Report & Written Opinion from PCT Application No. PCT/US10/61997, mailed Mar. 3, 2011.
Chenghsien Yu, et al. "A Study of Using Automatic Text Indexing to Analyze Web Browsing Behavior" Proceedings of the 5 World Congress on Intelligent Control and Automations, Jun. 15-19, 2004, Hangzhou, P.R. China.
Yong Tan, et al. "Analysis of a least recently used cache management policy for web browsers" Operations Research, v. 50, n. 2, p. 345-57, Jan. 1999.
Christian von der Weth, et al.,"COBS: Realizing Decentralized Infrastructure for Collaborative Browsing and Search", 2011 Internationl Conference on Advanced Information Networking and Applications, (AINA 2011), p. 617-24, 2011, Mar. 22-25, 2011.
Hui Chen, et al., "Business-to-Consumer Mobile Agent-Based Internet Commerce System (MAGICS)", IEEE Transactions on Systems, Man, and Cybernetics-Part C: Applications and Reviews, vol. 37, No. 6, pp. 1174-1189, Nov. 1, 2007.
W. Ulam, et al. "Technical considerations in remote LIMS access via the World Wide Web", J Autom, Methods Manag. Chem. (UK); v 2005, n. 4, pp. 217-222, Dec. 11, 2005.
Victor Pascual-Cid, "An Information Visualisation System for the Understand of Web Data", VAST'08—IEEE Symposium on Visual Analytics Science and Technology, Proceedings, p. 183-184, Oct. 21, 2008.
Alison Lee, et al. "Browsers to Support Awareness and Social Interaction", IEEE Computer Graphics and Applications, v 24, n. 5, p. 66-75, Sep. 1, 2004.
Wikipedia, the free encyclopedia webpage http://en.wikipedia.org/wiki/List_of HTTP_header_fields#Requests, Aug. 11, 2011, 7 pp. Wikimedia Foundation, Inc.
Overriding a JavaScript function while referencing the original, http://stackoverflow.com/questions/296667/overriding-a-javascript-function-while-referencing-the . . . , pp. 1-3, downloaded Dec. 28, 2010.
The Wall Street Journal, Your Apps Are Watching You, Scott Thurm et al., dated Dec. 17, 2010, http://topics.wsj.com/article/SB10001424052748704694004576020083703574602.html, pp. 1-7, downloaded Dec. 28, 2010.
The Wall Street Journal, Watchdog Planned for Online Privacy, Julia Angwin, dated Nov. 11, 2010, http://online.wsj.com/article/SB10001424052748703848204575608970171176014.html, pp. 1-3, downloaded Dec. 28, 2010.
Google Analytics without javascript!, http://www.vdgraaf.info/google-analytics-without-javascript.html, pp. 1-10, Posted Feb. 28, 2007, downloaded Dec. 24, 2010.
How to add event handler with Prototype new Element() constructor?, http://stackoverflow.com/questions/278927/how-to-ad-event-handler-with-prototype-new-element . . . , pp. 1-3, downloaded Dec. 28, 2010.
Dive Into Greasemonkey, 4.22. Overriding a built-in-Javascript method, http://diveintogreasemonkey.org/patterns/override-method/html, pp. 1-2, downloaded Dec. 28, 2010.
Adding elements to the DOM, http://www.javascriptkit.com/javatutors/dom2.shtml, pp. 1-3, downloaded Dec. 28, 2010.
PCT International Search Report for PCT application No. PCT/US 11/67870 mailed May 3, 2012, 11 pages.
Lightweight Self-Protecting JavaScript, Phu H. Phung, et al., ASIACCS;09, Mar. 10-12, 2009, Sydney, NSW, Australia, © 2009, pp. 47-60.

* cited by examiner

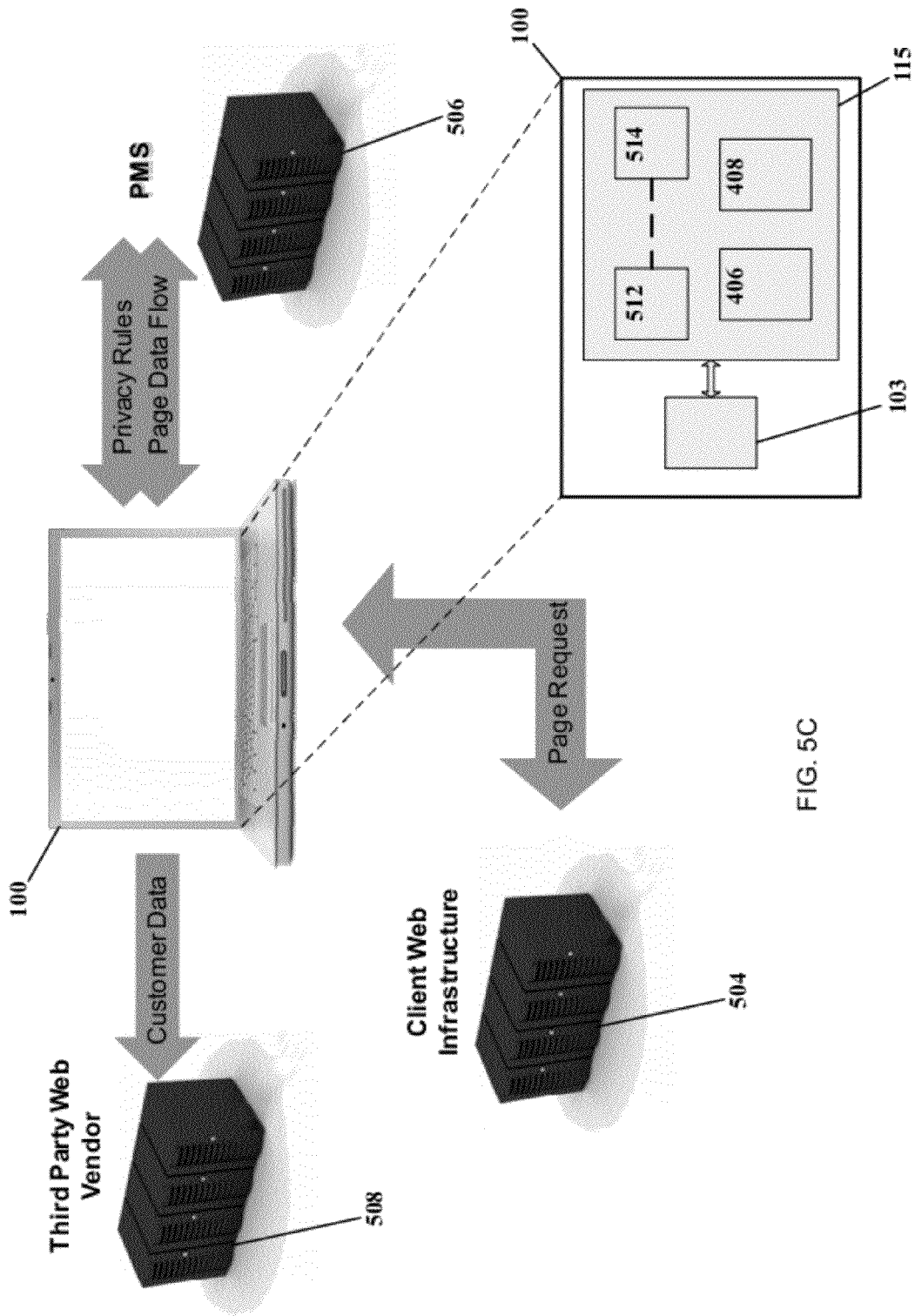

ONLINE PRIVACY MANAGEMENT

This application claims priority from U.S. Provisional Application Ser. No. 61/428,560, filed Dec. 30, 2010, including its concurrently-filed appendices; all of the aforementioned is herein incorporated by reference in its entirety.

TECHNICAL FIELD

Aspects of the disclosure generally relate to management, regulation, control, and/or auditing of analytics and other data to be collected from a user's terminal. In particular, various aspects of the disclosure discuss features of an online privacy management system.

BACKGROUND

Web pages are generally written in Hypertext Markup Language (HTML). They are written using HTML elements that include "tags" surrounded by angle brackets; information in the tag tells the web browser how to interpret the HTML element (e.g., as text, for insertion of an image into the webpage, for running a script, etc.). These tags can, among other things, include or can load scripts in languages such as JavaScript™.

Meanwhile, web analytics is a field in which data about customers (e.g., customer behavior, customer location, etc.) is collected and analyzed for a variety of purposes. To obtain data for web analytics, a population of users visits a web page and/or starts an application that causes certain program instructions to be executed. Usually, data is collected for web analytics purposes through a variety of mechanisms, including the setting of a cookie and/or by running scripts in the HTML document. The scripts may perform a variety of functions, including grabbing variables from the document object model (DOM) and/or sending back an image request to a data collection server either internally or externally hosted.

The program instructions for web analytics are generally authored and run by a variety of vendors, including Omniture™, Google™, Yahoo™, and Webtrends™, among others, in order to be able to capture data such as web page load times, "mouse overs" (i.e., moving a mouse over a particular object on the web page), and the page requestor's IP address. A medium complexity web page may include 5-10 tags with a reference to computer scripts that are run on servers managed by different vendors.

When a marketer assigned to manage web analytics for an organization decides that she wants to change the code/tagging to measure and analyze different features, the process is often tedious and challenging. In many situations, to perform this update, the marketer must create a new custom variable in the program instructions, define what the new variable is, and specify what data the modified code must capture for the web page. Since the marketer is generally not skilled in how to perform these modifications, she must interface with her information technology (IT) department or other similar agency. Sometimes, even the IT department may not adequately understand the syntax of the web analytics program instructions to properly modify the code, especially given that the myriad web analytics vendors, advertisers, survey researchers, and marketers all have their own custom computer code for effectuating the collection of data for analysis. In other situations, the IT department may not have the appropriate bandwidth to modify the code for deployment on schedule (e.g., for an advertisement campaign deadline, etc). These problems are only exacerbated when a client's website has many pages and/or many different types of program instructions for collecting various data about a user.

Some web analytics tools use the HTML image element and/or JavaScript to assist in collecting analytics data. An analytics data transmission may be masked as an image element that does not add the image element to the webpage's DOM. Instead, the image element may be for a one pixel by one pixel transparent image by the analytics vendor for the purposes of collecting data related to the webpage visitor. For example, the "src" attribute may be set to a URL with an appended string of parameter name-value pairs (e.g., www.hostname.com/
theImage.gif?data=something&data2=someMoreData).

Once the "src" attribute is set, the browser may attempt to locate and retrieve the image at the URL location. In doing so, the analytics data may be obtained at the remote server as these name-value pairs. This is one method frequently used by web analytics vendors for collecting data.

Some companies may outsource their web analytics to one or more third party vendors (e.g., web analytics vendors, voice of consumer (VOC), ad servers, testing solutions, targeting tools, pay per click (PPC) tools, affiliate tracking, etc.) that specialize in web analytic, web advertising, and other web-related services. Meanwhile, these third party vendors may contract/work with one or more fourth party vendors to assist in collecting data, displaying/selecting advertising images, analyzing collected data, etc. For example, a fourth party vendor may be executing code on the companies' webpages or collecting analytics data from the webpages. This fourth party vendor may be unknown to the website owner or might not be an industry-verified vendor. Some fourth party vendors might not respect DNT (Do-Not-Track) Headers, unbeknownst to the website owner/company. In some case, the fourth party vendor may even share the information collected about visitors with fifth party vendors, again unbeknownst to the website owner/company. As such, data may be collected and distributed from the website to domains and vendors unknown to the website administrator. Privacy and other issues (e.g., technical issues) may arise in regulating, controlling, and/or auditing the dissemination of the data. The disclosure attempt to provide an online privacy management system that, among other things, permits users (e.g., Chief Privacy Officers of a company, etc.) to better control/regulate/manage consumer data and privacy.

BRIEF SUMMARY

Aspects of the disclosure address one or more of the issues mentioned above by disclosing methods, computer readable media, and apparatuses for an online privacy management system and related systems. In one example, a system may assist in managing, regulating, controlling, and/or auditing of transmission of collected data (e.g., web analytics or other data) collected from a user's terminal to external servers. The privacy management system may simplify the process by which users (e.g., Chief Privacy Officers (CPOs), webpage visitors, etc.) can oversee with whom and/or what information is being collected for transmission to third-party and fourth-party computer servers.

In one example in accordance with aspects of the disclosure, a privacy management system's non-transitory computer-readable medium storing scripting code written in a programming language that lacks functionality to override a setter function of a variable corresponding to a uniform resource locator stored in a predefined object, wherein when the scripting code is executed by a processor of a computing device located remotely from the privacy management system, the scripting code causes the remote computing device to perform numerous steps is disclosed. In some examples, the steps may include one or more of the steps described herein. For example, the remote computing device may perform one or more steps of: monitoring in realtime, using the processor, a document object model of a webpage to identify updates to the document object model that cause modification of the uniform resource locator stored in the predefined object; comparing in realtime, using the processor, the modified uniform resource locator to a predetermined list of values; and/or blocking in realtime, using the processor, transmission of web analytics data to a server associated with the modified uniform resource locator, based on the comparing. In addition, in some examples, the remote computing device may also perform one or more steps of: defining, using the processor, a new object, wherein the new object is a wrapper object overriding the predefined object; and/or creating the new object in the document object model, using the processor, wherein the new object is configured to store at least an uniform resource locator. One or more of the steps described above may be optional or may be combined with other steps. In some examples, the monitoring step may include causing the processor to check for updates to the uniform resource locator stored in the new object.

In another example in accordance with aspects of the disclosure, a computerized apparatus comprising: a processor configured to transmit, over a network to a remote computing device, scripting code written in a programming language that lacks functionality to override a setter function of a first attribute in a predefined object; and a memory storing the scripting code, which when executed by the remote computing device, causes the remote computing device to perform numerous steps is disclosed. In some examples, the steps may include one or more of the steps described herein. For example, the remote computing device may: define a new object comprising a wrapper object overriding the predefined object, including configuring a processor of the remote computing device to create, in a memory of the remote computing device, the new object instead of the predefined object in response to a request to create the predefined object; check on a regular interval for updates to a second attribute stored in the new object, wherein the second attribute is associated with the first attribute stored in the predefined object; compare the second attribute to a predetermined list of values, responsive to determining that the second attribute stored in the new object has been updated by other scripting code executing on the remote computing device, wherein the other scripting code is transmitted from a remote third-party server different from the computerized apparatus; and/or block the other scripting code from causing the remote computing device to send collected data, responsive to the comparing of the second attribute to the predetermined list of values. In addition, in some examples, the collected data may comprise web analytic data, the predefined object may be a hypertext markup language image object, the first attribute and second attribute may be configured to store uniform resource locators, and/or the blocking of the other scripting code may be performed in realtime. One or more of the steps described above may be optional or may be combined with other steps. Furthermore, in some examples in accordance with aspects of the disclosure, the predetermined list of values may comprise at least one of: a blacklist and a whitelist, wherein the other scripting code may be blocked responsive to at least one of: determining that the second attribute of the new object is in the blacklist, and determining that the second attribute of the new object is not in the whitelist.

In yet another example in accordance with aspects of the disclosure, a method of controlling distribution of web analytic data using an online privacy management system is disclosed. In some examples, the method may include one or more of the steps described herein. For example, the method may include one or more steps of: receiving a page from a remote server corresponding to a first domain, wherein the page comprises at least a plurality of elements that cause a computer processor to send data to a domain different from the first domain; processing, using the computer processor, a first element of the plurality of elements of the page, wherein the first element stores a first uniform resource locator referencing a privacy management system server storing scripting code for privacy management; sending, using the computer processor, a request to the privacy management system server for the scripting code for privacy management; executing, using the computer processor, the scripting code for privacy management to at least define an overridden object, wherein the overridden object is a wrapper object overriding a predefined object; processing, using the computer processor, a second element of the plurality of elements after the executing of the scripting code for privacy management, wherein the second element is configured to cause creation of the predefined object configured to send data to a domain different from the first domain and different from the privacy management system server; creating, in a computer memory using the computer processor, the overridden object instead of the predefined object corresponding to the second element, wherein the overridden object is configured to store at least an uniform resource locator; storing in the overridden object a second uniform resource locator received from the second element, wherein the second uniform resource locator corresponds to a second domain; creating, in the computer memory using the computer processor, the predefined object, wherein the predefined object is configured to store at least an uniform resource locator; causing, by the scripting code for privacy management, the computer processor to check for updates to the uniform resource locator stored in the overridden object; in response to determining that the uniform resource locator of the overridden object has been updated to the second uniform resource locator, comparing, by the scripting code for privacy management, the second uniform resource locator stored in the overridden object to a predetermined list of domains; in response to determining that the second uniform stored in the overridden object is in the predetermined list, blocking, by the scripting code for privacy management, the second element from configuring the page to send collected data to the second uniform resource locator, wherein the collected data comprises web analytic data; and/or in response to determining that the second uniform stored in the overridden object is not in the predetermined list, updating, by the scripting code for privacy management, the uniform resource locator stored in the predefined object to the second uniform resource locator. In addition, in some examples, the blocking may be performed in realtime and comprise one or more steps of: modifying the second uniform resource locator to clear the collected data; and/or storing the modified second uniform resource locator in the predefined object. In some examples, the computer processor may check for updates to the second uniform resource locator of the overridden object on a predetermined interval, and not using a push model. In addition, in some examples, the second element may be a script tag in hypertext markup language and include a fourth uniform resource locator, and the method may also include one or more steps of: causing, by the second element, an update of the second uniform resource locator stored in the overridden object to the fourth uniform resource locator, wherein the fourth uniform resource locator is in the predetermined list of domains; recording in a log the second uniform resource locator that corresponds to the second domain; and/or recording in the log in association with the second uniform resource locator, at least the fourth uniform resource locator. One or more of the steps described above may be optional or may be combined with other steps. Furthermore, in some examples, the two steps of recording in the log may include reading a stack trace using the computer processor to obtain information for the log file.

In one example in accordance with aspects of the disclosure, a privacy management system's computer-readable storage medium storing computer-executable instructions, which when executed by a processor of a computing device located remotely from the privacy management system, causes the remote computing device to perform numerous steps is disclosed. In some examples, the steps may include one or more of the steps described herein. For example, the remote computing device may perform one or more steps to: define an overridden object, wherein the overridden object is a wrapper object overriding a predefined object, wherein the overridden object is configured to store at least an uniform resource locator, wherein the predefined object is configured to store at least an uniform resource locator; and wherein the defining an overridden object configures the processor to create, in a memory, the overridden object instead of the predefined object in response to a request to create the predefined object; create, in the memory, the predefined object, wherein the predefined object is associated with the overridden object; cause the processor to check for updates (e.g., on a predetermined interval, using a push model, etc.) to the uniform resource locator stored in the overridden object; compare (e.g., in realtime) the updated uniform resource locator stored in the overridden object to a predetermined list of domains, in response to determining that the uniform resource locator of the overridden object has been updated; and/or based on results of the compare, performing one of: (i) modify the updated uniform resource locator stored in the overridden object to remove collected data and store the modified updated uniform resource locator in the predefined object, and (ii) store the updated uniform resource locator in the predefined object. In some examples in accordance with aspects of the disclosure, additional steps may be performed to: create, in the memory, the overridden object, in response to a request to create the predefined object; and/or compare the updated uniform resource locator stored in the overridden object to the predetermined list of domains. One or more of the steps described above may be optional or may be combined with other steps. In one example, the computer-executable instructions may be written in a programming language that lacks functionality to override a setter function of a variable corresponding to the uniform resource locator stored in the predefined object. Furthermore, in some examples, the modified updated uniform resource locator may be a portion of the updated uniform resource locator modified with a default value. In addition, in some examples, the predetermined list of domains may include a whitelist and/or a blacklist, and the updated uniform resource locator may be stored in the predefined object based on the updated uniform resource locator being a part of the whitelist and/or not part of the backlist.

In addition, in accordance with aspects of the disclosure, the methods, apparatus, and computer-readable medium described herein may further include the steps to cause a remote computing device to: define an overridden method overriding a predefined method, wherein the defining an overridden method configures the processor to execute, by the processor, the overridden method instead of the predefined method in response to a request to execute the predefined method; cause the processor to execute the predefined method subsequent to execution of the overridden method (e.g., using the modified uniform resource locator as the input parameter to the predefined method); receive an uniform resource locator corresponding to a third domain as an input parameter to the predefined method, and wherein the third domain is different from a domain corresponding to the privacy management system server; compare the received uniform resource locator to the predetermined list of domains; and/or in response to determining that the received uniform resource locator stored is in the predetermined list, modify the uniform resource locator stored to remove the collected data. One or more of the steps described above may be optional or may be combined with other steps. In some examples, the predefined method may be a constructor method corresponding to an image element in hypertext markup language, and the predefined method may be at least one of: an appendChild function, an insertBefore function, a replaceChild function, and a write function.

In one example in accordance with aspects of the disclosure, a privacy management system's computer-readable storage medium storing computer-executable instructions, which when executed by a processor of a computing device located remotely from the privacy management system, causes the remote computing device to perform numerous steps is disclosed. In some examples, the steps may include one or more of the steps described herein. For example, the remote computing device may perform one or more steps to: display the predetermined list of domains, wherein the predetermined list is configured to support regular expressions with wildcards; generate a graphical user interface configured to permit updates to the predetermined list by adding and deleting entries in the predetermined list; send the updated predetermined list to the privacy management server for storage; generate an graphical user interface comprising an input means configured to enable scripting code for privacy management; send a state of the input means to the privacy management server for storage; before the defining of the overridden object, determine that the scripting code for privacy management is disabled; reconfigure the processor to no longer create the overridden object instead of the predefined object in response to a request to create the predefined object; reconfigure the processor to no longer cause the processor to check for updates to the uniform resource locator stored in the overridden object; display a list of one or more domains providing third-party scripting code to the remote computing device, wherein the third-party scripting code is configured to cause the remote computing device to send the collected data to a remote server; determine that the remote server is associated with a domain on the blacklist; display the domain on the blacklist that corresponds to the domain providing third-party scripting code; display whether the processor of the remote computing device is configured to block execution of the third-party scripting code; determine a location of the remote computing device; identify a privacy rule corresponding to the location of the remote computing device; and/or configure the processor to block sending of the collected data when the privacy rule has been met. One or more of the steps described above may be optional or may be combined with other steps.

This summary is provided to introduce a selection of concepts in a simplified form that are further described below in the detailed description. The summary is not intended to identify key features or essential features of the claimed subject matter, nor is it intended to be used to limit the scope of the claimed subject matter. Moreover, one or more of the steps and/or components described above may be optional or may be combined with other steps.

BRIEF DESCRIPTION OF FIGURES

Systems and methods are illustrated by way of example and are not limited in the accompanying figures in which like reference numerals indicate similar elements and in which:

FIGS. 5A, 5B, and 5C (all based on, inter alia, Appendix C in U.S. Provisional Application Ser. No. 61/428,560) illustrate a high-level diagram of a webpage with numerous web vendors, including third party and fourth party vendors, interacting with the webpage, in accordance with various aspects of the disclosure.

DETAILED DESCRIPTION

Figure 1:
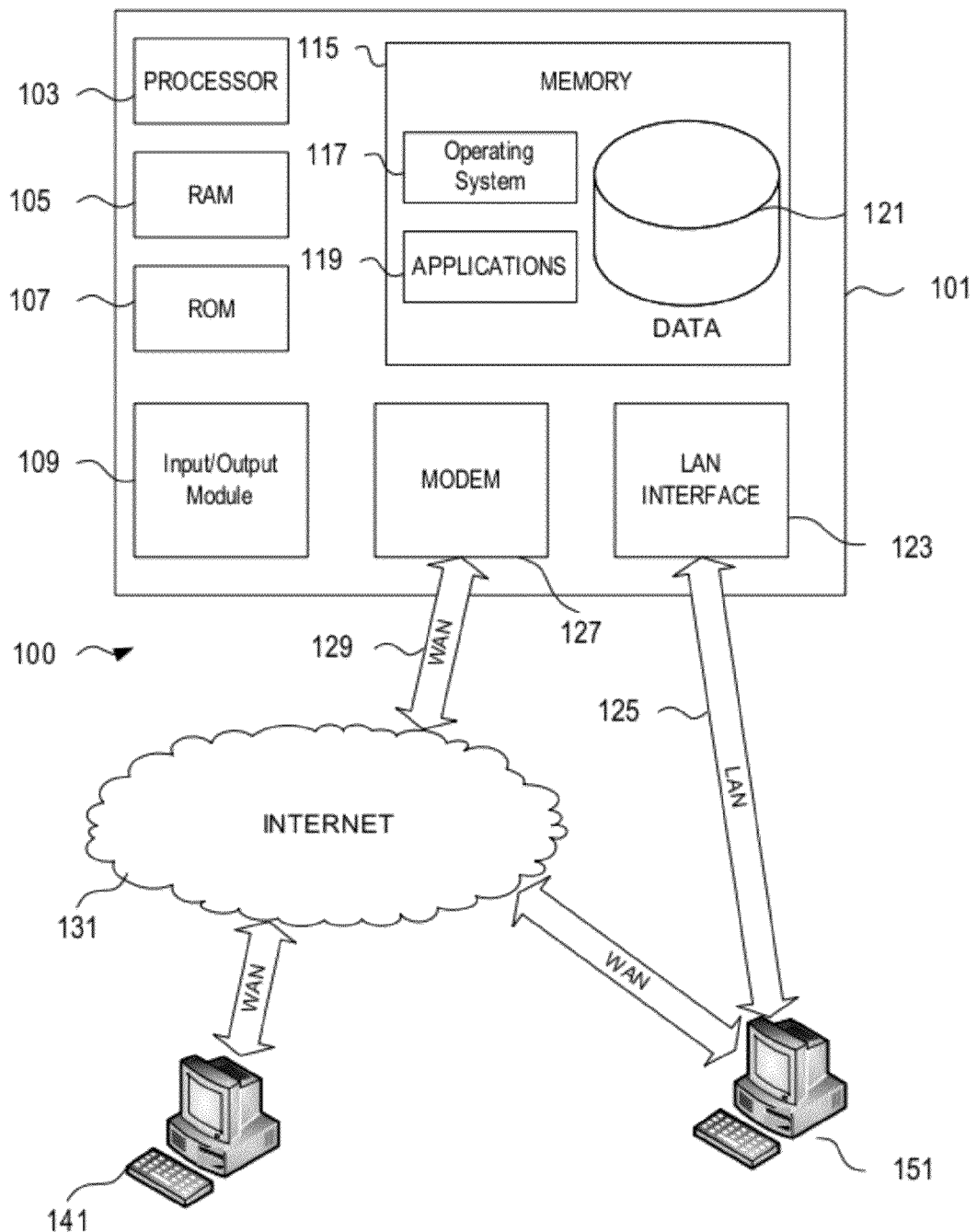
FIG. 1 shows an illustrative operating environment in which various aspects of the disclosure may be implemented.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

A privacy management system (PMS) is disclosed for a Chief Privacy Officer (CPO) or other user to use in, among other things, monitoring and/or controlling in realtime the flow of data (e.g., outflow) about the user and his/her online experience. The PMS may provide a dashboard displaying a whitelist and/or blacklist indicating what destinations/sources are blocked or allowed. The PMS includes browser-client scripting code and may also include a PMS-certified verification icon for display on webpages being monitored/controlled in realtime by the PMS.

Systems and methods are disclosed directed at steps performed by a web browser application while interacting with a webpage that is monitored by a privacy management system (PMS). The browser may receive a page (e.g., HTML page) comprising scripting code (e.g., Javascript) from multiple sources (i.e., privacy management server, third-party analytics vendors, third-party targeted ads vendors, etc.) The browser may execute the scripting code, thus causing the plurality of elements (e.g., scripting tags, image tags, etc.) on the page to send data to different domains. The scripting code may, in some examples, override particular standard methods (e.g., appendChild method) and constructor methods for particular page elements (e.g., image element). The overridden method may be executed at the browser (i.e., on the user's device) such that communication between the browser and particular domains or subdomains may be blocked or allowed. In some examples, the PMS may implement rules to determine whether to block or allow the communication, or may rely on default rules. The result of monitoring and control by a PMS may be displayed on an (online) dashboard for a CPO or other person. The PMS may generate messages in response to particular events (e.g., blocking) occurring in realtime.

In addition, systems and methods are disclosed directed at a remote server that provides the scripting code that is executed to enable the PMS to manage and control the flow (e.g., outflow) of data. The code may include Javascript code that overrides existing Javascript methods and/or constructors for Javascript objects, and is referred to herein as an "overridden method" or "overridden object." The existing method or object that is being overridden is referred to herein as the "predefined method" or "predefined object."

In addition, systems and methods are disclosed directed at a universal PMS-certified verification icon that may be provided and displayed on a webpage to indicate that the webpage is compliant with particular privacy policies. The icon may be provided by the PMS and information about privacy preferences/settings for the PMS to implement may be stored in the PMS system. Alternatively, the privacy preferences/settings information may be stored on the client's device (e.g., as a cookie) or other location.

In accordance with various aspects of the disclosure, a privacy management system (PMS) is disclosed for, among other things, enhancing control over consumer data collection and online privacy. A Chief Privacy Officer (CPO), or anyone interested in managing the collection and distribution of information about an online user (e.g., web analytics, data mining, etc.) may use the PMS to monitor, collect information about, report about, and/or block in realtime the distribution of data about users. In one embodiment, the PMS may be used in conjunction with Ensighten's "Ensighten Manage"™ product for tag management. In another embodiment, aspects of the PMS may be used in conjunction with other web analytics and/or tag management products readily available in the market, such as those by ObservePoint™, Google™, SiteCatalyst™, and others. In addition, the PMS may provide a dashboard displaying a whitelist and/or blacklist indicating what destinations/sources are blocked or allowed. The PMS includes browser-client scripting code and may also include a PMS-certified verification icon for display on webpages being monitored/controlled in realtime by the PMS.

FIG. 1 describes, among other things, an illustrative operating environment in which various aspects of the disclosure may be implemented (e.g., see Appendix A in U.S. Provisional Application Ser. No. 61/428,560). FIG. 1 illustrates a block diagram of a tag/content manager 101 (e.g., a computer server) in communication system 100 that may be used according to an illustrative embodiment of the disclosure. The manager 101 may have a processor 103 for controlling overall operation of the manager 101 and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 to provide instructions to processor 103 for enabling manager 101 to perform various functions. For example, memory 115 may store software used by the manager 101, such as an operating system 117, application programs 119, and an associated database 121. Processor 103 and its associated components may allow the manager 101 to run a series of computer-readable instructions to deploy program instructions according to the type of request that the manager receives. For instance, if a client requests that program instructions for capturing mouse movements for complete session replay be executed, manager 101 may transmit the appropriate instructions to a user's computer when that user visits the client's website.

The manager 101 may operate in a networked environment supporting connections to one or more remote computers, such as terminals 141 and 151. The terminals 141 and 151 may be personal computers or servers that include many or all of the elements described above relative to the manager 101. Alternatively, terminal 141 and/or 151 may be part of a "cloud" computing environment located with or remote from manager 101 and accessed by manager 101. The network connections depicted in FIG. 1 include a local area network (LAN) 125 and a wide area network (WAN) 129, but may also include other networks. When used in a LAN networking environment, the manager 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the manager 101 according to an illustrative embodiment of the disclosure may include computer executable instructions for invoking functionality related to delivering program instructions and/or content.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
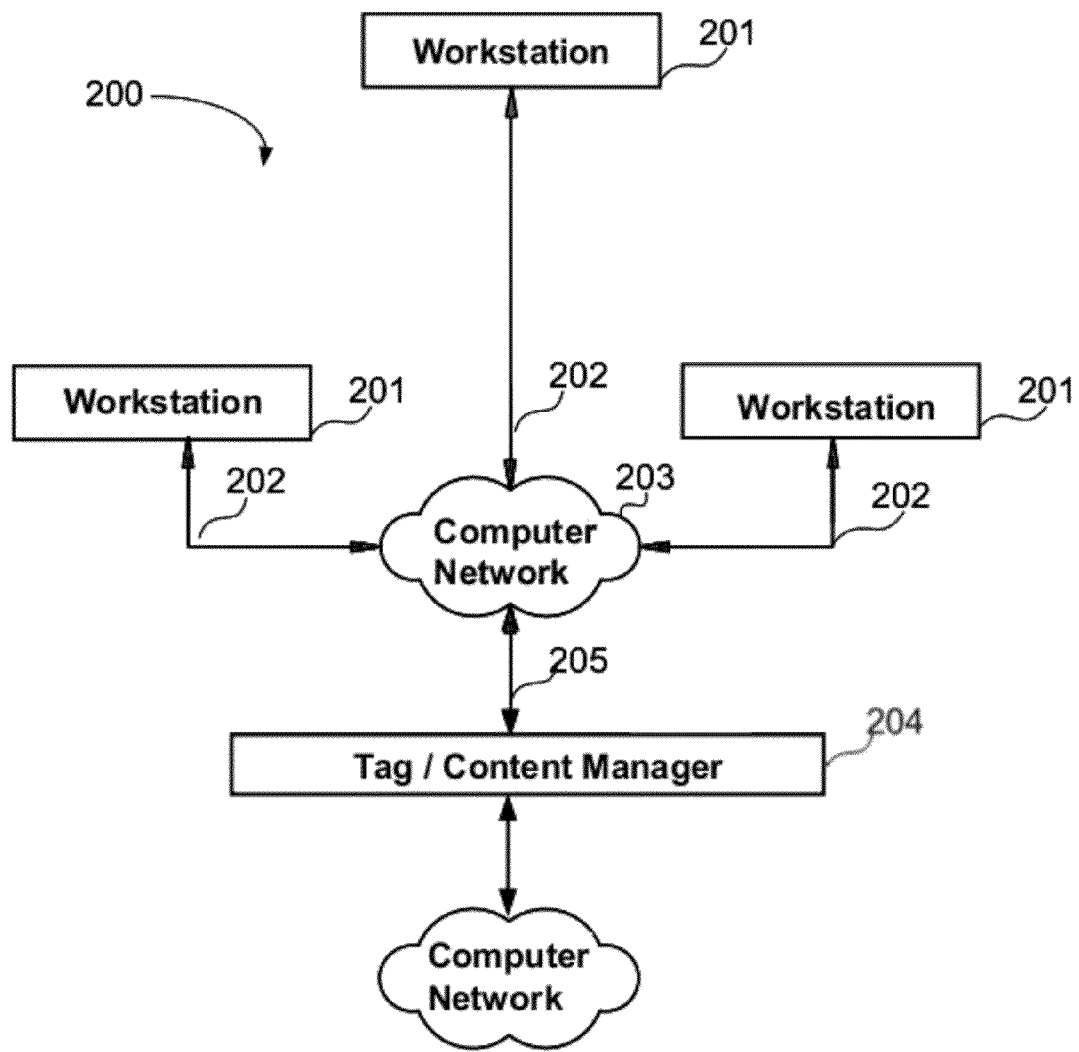
FIG. 2 is an illustrative block diagram of workstations and servers that may be used to implement the processes and functions of certain aspects of the disclosure.

Referring to FIG. 2, that figure describes an illustrative block diagram of workstations and servers that may be used to implement the processes and functions of certain aspects of the disclosure (e.g., see Appendix A in U.S. Provisional Application Ser. No. 61/428,560). FIG. 2 describes an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to tag/content manager 204. In certain embodiments, workstations 201 may be different storage/computing devices for storing and delivering client-specific program instructions or in other embodiments workstations 201 may be user terminals that are used to access a client website and/or execute a client-specific application. In system 200, manager 204 may be any suitable server, processor, computer, or data processing device, or combination of the same. Throughout this disclosure, tag/content manager 204 will be used to reference both the server/terminal that stores program instructions for tag/content management and the tag/content management program instructions themselves.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

Taking as an example the Ensighten Manage™ product, aspects of which are described in Appendix A of U.S. Provisional Application Ser. No. 61/428,560, a webpage author may include Ensighten's code (or other similar code 510A) (e.g., a single consistent line of Javascript code) at the top of the webpages 502 on their website servers 504. This code permits the management of content/tags associated with the webpage. For example, the Ensighten Manage™ product may be used to collect analytics data about the movement of the webpage visitor's mouse over a particular object (e.g., "mouse over") and transmit this data to a remote server (e.g., Ensighten's database 506, the webpage owner's database 504, or other servers 508) for storage/analysis. Assuming the webpage owner is operating the tag management software, they are directly managing what data is collected about their webpage visitors and where that data is distributed. In such a scenario, a CPO might not need a PMS to monitor and regulate (e.g., block) the flow of analytic data about their website visitors.

Figure 5A:
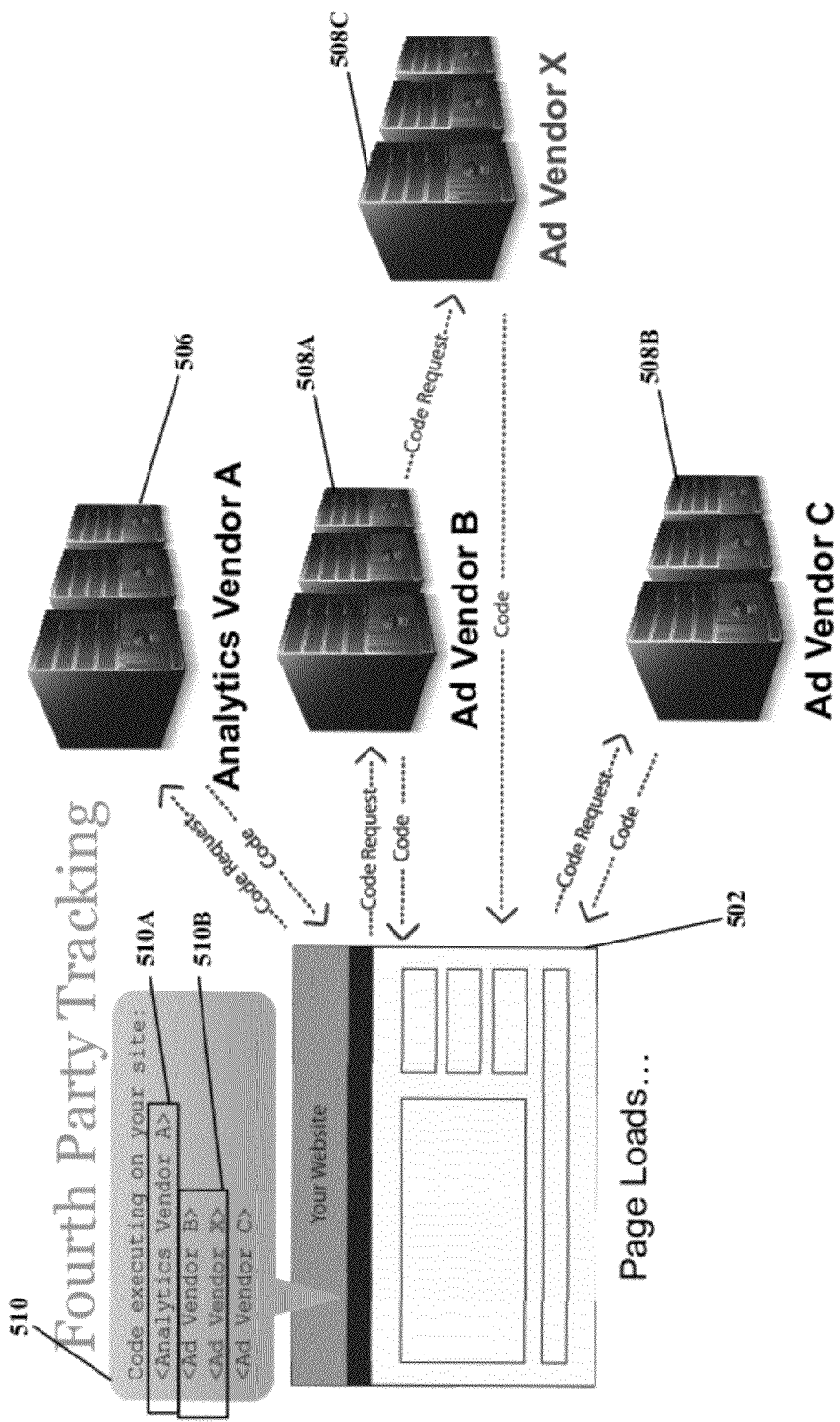
Figure 5B:
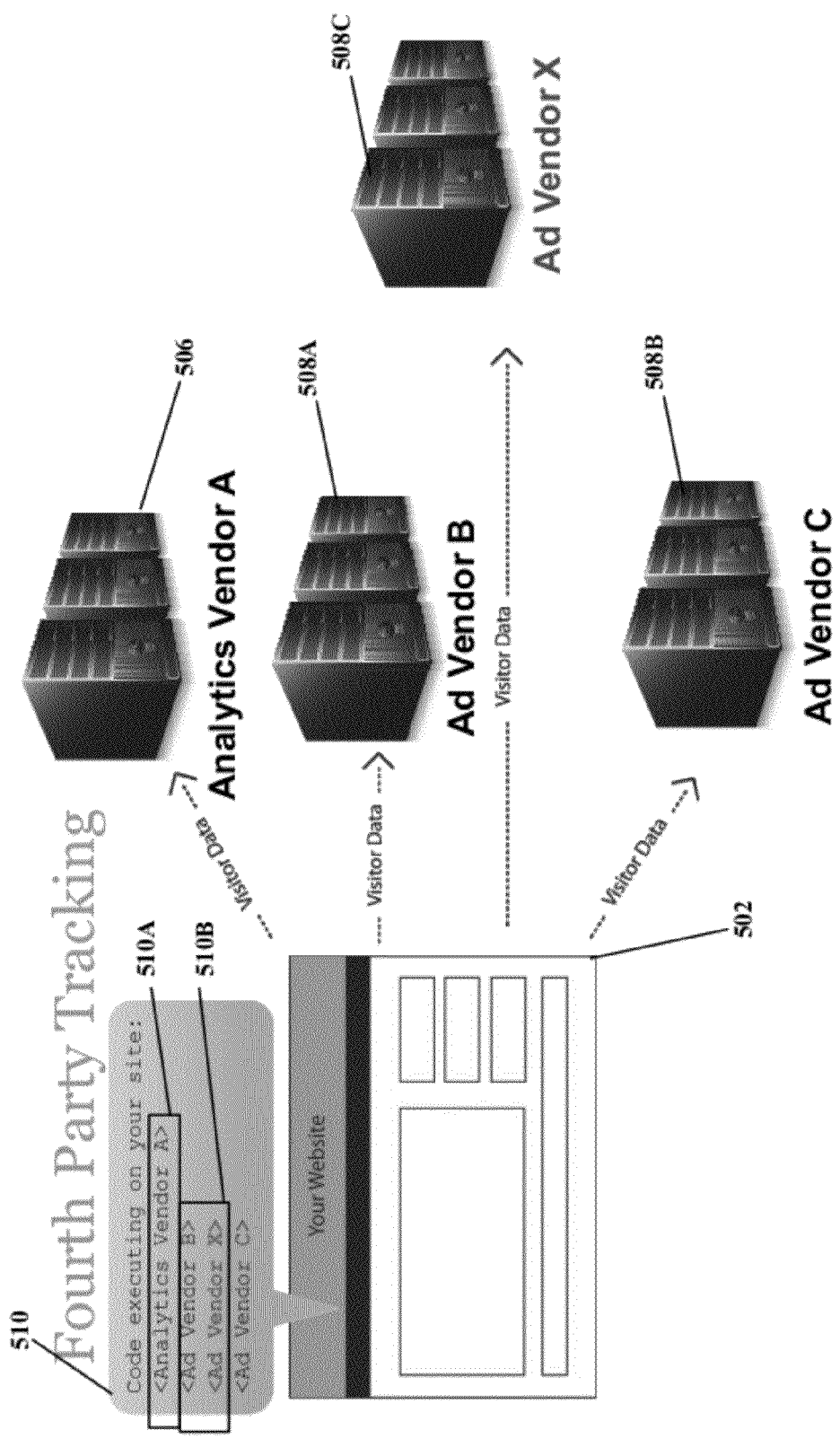

However, some companies may outsource their web analytics to one or more third party vendors 508A, 508B that specialize in web analytic, web advertising, and other web-related services. Meanwhile, these third party vendors may contract/work with one or more fourth party vendors 508C to assist in collecting data, displaying/selecting advertising images, analyzing collected data, etc. In the examples illustrated in FIGS. 5A, 5B, and 5C, a fourth party vendor (e.g., "Ad Vendor X" 580C) may be executing code 510B on the companies' webpages 502 or collecting analytics data from the webpages. This fourth party vendor may be unknown to the website owner. In such a scenario, a CPO might not have the same control over the collection and flow of information about their website visitors as in the prior scenario. Moreover, if privacy concerns (e.g., through customer complaints, from privacy laws in different jurisdictions, etc.) are raised, a CPO might not be able to efficiently assess and regulate (e.g., in realtime) the outflow of analytic data.

Basic PMS for Offline Auditing of Static Webpages. In one embodiment, the PMS may be used to audit a website. The PMS may parse a webpage (e.g., HTML) and identify all elements (e.g., image tags, Javascript tags, Flash™ tags, Applet™ tags, etc.) on the webpage. The PMS may identify the location (e.g., URL, domain, subdomain) corresponding to these elements. For example, the PMS, in such an example, may identify the domain from which all images elements (e.g., the "src" attribute of HTML image tag) are being sourced. A basic CPO dashboard (i.e., a graphical user interface that may be displayed on a computer screen) may identify the various domain names and identify what type of information is being passed to those domains. In another example, the PMS used to audit the website may also check and analyze the PMS methods for suspected attempts at modification and report them (e.g., through the CPO dashboard). In some embodiments, the checking and analysis may also use a covertly deployed JavaScript monitoring program including aspects of features described in this disclosure. In yet other embodiments, the PMS may perform direct (or hash) comparisons of selected PMS methods' code to check for modifications. The checks and/or analysis may occur at various different times, including during periodic spot checks and report the findings accordingly.

While this approach is sufficient for a basic static webpage where HTML elements are built into the page, it may be inadequate when scripting (e.g., Javascript code) is dynamically updating the attribute values of HTML elements on the webpage and/or adding new elements to the document object model (DOM) of the webpage. In addition, the PMS in this example performs its audit offline (e.g., using web spiders/robots), and as such, is incapable of providing realtime information about and controlling the flow of data from the webpage.

PMS for Realtime Monitoring and/or Control of Dynamic Webpages. In yet another embodiment, the PMS may provide realtime information about and control of the flow of data (e.g., analytics data of a webpage) to and from a webpage 502 on a company's web servers 504. Scripting code (e.g., Javascript code) may be embedded in the webpage (e.g., at the top of the webpage) to permit the PMS to interact with the DOM and other aspects of the webpage. Such scripting code may be integrated with existing tag management or web analytic solutions. For example, this scripting code may be included as part of Ensighten's code 510A at the top of a webpage 502 as per the Ensighten Manage™ product.

Overriding Particular Methods. When a webpage is loaded, the PMS's client-browser scripting code 510 may execute on the website visitor's computing device 100 (e.g., personal computer, laptop, smartphone, tablet, etc.) Ensuring that this scripting code (e.g., Javascript) is executed before external vendors (e.g., third party, fourth party, etc.) code is executed, the PMS's client-browser scripting code 510A may override one or more Javascript methods available on the DOM of the webpage. As a result, as subsequent scripts and page elements 510 (e.g., HTML tags) are processed and rendered on the webpage, the PMS-overridden Javascript methods are executed instead of the standard Javascript methods. In particular, it may be desirable to override those methods that may result in the creation or adding of new elements to the DOM. For example, in the current Javascript standard, some examples of such methods include, but are not limited to, the (1) appendChild, (2) insertBefore, (3) replaceChild, and (4) write methods.

Javascript AppendChild( ) Example. For example, with the appendChild( ) method, which adds a node after the last child node of the inputted element node, the method may be overridden with at least the following sample 4 lines of pseudo-code:

```
Line 0: Node.prototype._appendChild = Node.prototype.appendChild;
Line 1: Node.prototype.appendChild = function(a) {
Line 2: //code for monitoring and regulating the appendChild method
Line 3: this._appendChild(a); };
```

In Line 0, the "Node.prototype" language is used to refer to the base class that when modified, applies to all elements in the DOM. As such, "_appendChild" is used to store a reference to the original appendChild( )method that is part of the Javascript standard. Then in Line 1, the original appendChild( )method is overridden with the new, custom code in Line 2 and Line 3. Line 3 calls the original appendChild( ) function, but before that function is called, the PMS may insert code for monitoring and regulating the scripting occurring on the webpage. In particular, this code may inspect the "img" (image) element/object being passed into the appendChild( )method and examine it for information about what type of analytics data is being collected and where that data is to be sent. For example, if the "img" (image) element was an HTML image element (i.e., object), the value of the "src" attribute may indicate a domain name (e.g., URL with full path and file name) and other information. The term "domain" or "domain name" is used herein to refer, as appropriate, to the full URL of a resource or an abbreviated form of the URL.

Figure 6:
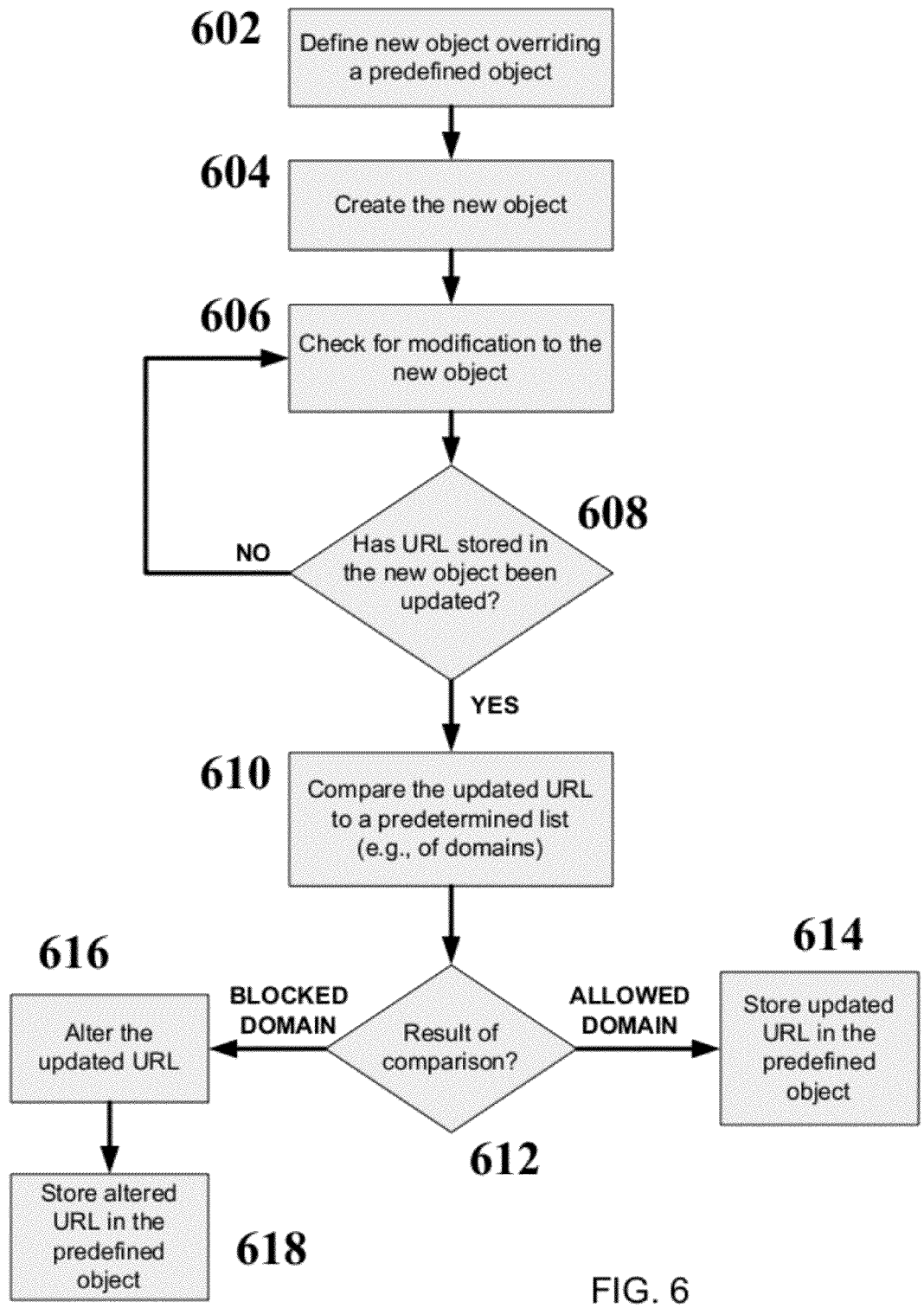
FIG. 6 illustrates a flowchart of a method related to an online privacy management system in accordance with various aspects of the disclosure.

Whitelist and Blacklist Feature. In addition, in some embodiments, the custom code in Line 2 may include a comparison of the domain name to known friendly and/or hostile domains. For example, the domain name may be compared against a whitelist 406 (i.e., friendly sites) and blacklist 408 (i.e., hostile sites). (See FIG. 6, ref 610). The comparing may be through a direct comparison, through a comparison involving regular expressions, or a combination of the two. The comparing may involve one or more or none of a domain's host, path, file, query parameters, hash, or HTTP header field (e.g., a user agent field, a referrer field, and/or a cookie field), or other parameter. The whitelist (and blacklist) may include regular expressions with wildcards in combination with domain names, subdomain names, or the like. In addition, the blacklist (or alternatively, the whitelist) may include a default expression to indicate that all unrecognized domain names should be blocked. A CPO may, through an online dashboard or the like (see FIG. 4), maintain those domains that should be included in the whitelist 406 and/or blacklist 408. In some examples, particular sites notorious for unauthorized tracking may be automatically added (or suggested for addition) to the blacklist. For example, a database of vendors (e.g., ad servers 508C, web analytics vendors, etc.) that are known to be non-compliant with privacy regulations (e.g., local regulations, foreign regulations, and/or DNT requirements) may be used by the privacy management system to populate the blacklist accordingly.

In those cases where the element attempting to be added to the DOM of the webpage is not authorized (i.e., the domain it is communicating with is on the blacklist, or it is not on the whitelist and the default setting is to block unrecognized domains), the PMS may, in realtime, block the element from being added to the DOM. Accordingly, code may be included in Line 2 above to make the desired comparison and then react accordingly. For example, if the element is to be blocked, the value of the "src" attribute of the "img" (image) element/object may be cleared before the "_appendChild" method call in Line 3. (See FIG. 6, ref 616). Alternatively, the "_appendChild" method in Line 3 may be skipped completely. In yet another alternative, the element may be added, but modified (e.g., using a default value) so as to render void its data collection capabilities (e.g., by clearing the values of any collected analytics data to be saved in the element/object.) For example, clearing the values of collected data may include modifying/clearing/removing name-value pairs appended to a URL. (See FIG. 6, ref. 618). One of skill in the art after review of the entirety disclosed herein will appreciate that at least one benefit of one or more of the aforementioned examples is that a PMS may perform realtime monitoring and blocking/allowing of information (e.g., web analytics) transmission to particular domains/URLs. Such realtime monitoring may allow for instantaneous control/regulation of web analytics distribution without relying on after-the-fact audit of offline webpages.

Additional Reporting Features of the PMS. In addition to providing a CPO online dashboard 400, other reporting techniques may also be used in conjunction with the PMS. For example, a SMS message (or other message type, e.g., SMTP e-mail message, voice message, instant messenger chat message, etc.) may be generated and sent to a CPO (or other person or computing system) in response to a domain on the blacklist attempting to collect and/or transmit analytics data on a company's website. In another embodiment, specific types of data may be flagged such that when client-side external scripts attempt to call particular methods associated with sensitive private user data, then a realtime (or delayed) alert may be generated. For example, if an external party's script attempts to call a method to read the unique device identifier (UDID) of a smartphone device (or other unique identifier of the browser or user), a message may be automatically generated and sent to the CPO. In addition, a report 402 may be generated and sent (e.g., by e-mail) to a CPO on a regular (e.g., weekly, monthly, daily, etc.) basis identifying the domain names that attempted to collect analytics data from the company's website and the types of analytic data.

Wrapper Techniques for Methods Prohibited from being Overridden.

Although the present Javascript standards permit some methods, such as "appendChild," to be overridden, the language prohibits other methods from being overridden. For example, the "src" attribute of the image element is set using a "setter" function that Javascript currently does not allow the PMS's client-browser scripting code to override. An authorized third party vendor 508A may include Javascript on the company's webpage that changes the "src" value to an unauthorized fourth party's domain 508C, and a PMS that relied solely on overriding methods and offline auditing may fail to catch the privacy policy breach.

In addition, in some instances, an analytics data transmission may be masked as an image element that is not appended to the webpage's DOM. Instead, the image element may be for a one pixel by one pixel transparent image by the analytics provider for the purposes of collecting data related to the webpage visitor. For example, the "src" attribute may be set to a URL with an appended string of parameter name-value pairs (e.g., www.hostname.com/theImage.gif?data=something&data2=someMoreData).

Once the "src" attribute is set, the browser may attempt to locate and retrieve the image at the URL location. In doing so, the analytics data may be obtained at the remote server as these name-value pairs. Consequently, overriding the method used to add that image element to the webpage or inspecting the DOM may be inadequate for a PMS to monitor and control (e.g., allow or block) the outflow of analytics data. Although the image element has been described herein as an example of one technique for collecting and transmitting information from a computing device to a remote server, the disclosure contemplates that other elements/objects may be used, and the techniques and/or systems described herein may be similarly applied to those others.

Therefore, in addition to overriding those desired methods that are capable of being overridden, in some embodiments, the PMS may include a non-transitory computer-readable medium storing scripting code (e.g., client-browser scripting code) to wrap the methods available for the HTML image element/object. One of ordinary skill in the art will appreciate after review of the entirety disclosed herein that other methods/objects (e.g., elements) may be "wrapped" (i.e., referred to as overridden in various examples in this disclosure) in this manner to overcome the prohibition (i.e., due to lack of functionality in the scripting language) on overriding some methods.

For example, a HTML image element is created in Javascript 510B using an image constructor. That constructor may be overridden. However, in addition to overriding the constructor method, the PMS client-browser scripting code 510A includes a timer (or equivalent mechanism) that triggers at regular intervals (e.g., 50 ms, etc.) to inspect the values of the attributes of the image element. (See FIG. 6, ref. 606). In particular, the value of the "src" attribute may be monitored to determine if Javascript code (or other code) 510B has modified the attribute value. (See FIG. 6, ref. 608). In an alternate embodiment, assuming the underlying platform 100 running the scripting code provides the functionality, the trigger may not be based on a repeating interval (or polling) model, but instead on a "push" model that automatically triggers upon detection of a change in an attribute value. (See FIG. 6, ref. 606). Such a model may be similar to how a hardware interrupt requests (IRQs) model operates, or to how event-based programming with a talker-listener model (e.g., push-interaction pattern) operates.

In the aforementioned example, the determination whether an attribute value has been modified may be made by the PMS client-browser scripting code comparing the retrieved value of the attribute to a stored value of the attribute. (See FIG. 6, ref 608). The stored value may have been obtained when the original image constructor was called. When it has been determined that the value of an attribute has changed, the PMS client-browser scripting code may inspect the updated value and other related information to decide whether to allow the updated value. (See FIG. 6, ref 612). In one example, the PMS scripting code may keep the attribute value the same. In other examples, the PMS may compare the new value to a whitelist 406 and/or blacklist 408 to determine whether to allow the updated value. (See FIG. 6, ref 612). In yet another example, the "src" attribute value may be changed to a default value (e.g., a URL corresponding to a neutral, transparent image) instead of the new value. (See FIG. 6, ref 616). Effectively, the PMS may conditionally keep the original image reference synchronized with the new image object created with the "wrapper" technique that overrides the image constructor. (See FIG. 6, refs. 614 & 618).

In one example in accordance with the disclosure, Javascript code may implement aspects of the example provided with at least the following sample lines of pseudo-code directed at the image element. One of skill in the art after review of the entirety disclosed herein will appreciate that the disclosure is not limited to just the HTML image element, and may be applied to other elements in the document object model (DOM) as well as other objects outside of the DOM:

```
Line 0: (function(scope) {
Line 1:    var ImageRef = scope.Image; scope.Image = function(a,b) {
Line 2:    var THIS = this, image, eventHandlers =
['Abort','Error','KeyDown','KeyPress','KeyUp','load'], exclude =
{ children:", childNodes:", outerHTML:"}, excludeMethods =
{naturalHeight:", naturalWidth:"};
Line 3:    image = new ImageRef(a,b);
Line 4:    // code here to make the object that the PMS's overridden
constructor returns (i.e.., "THIS") look exactly like the image object
that the original implementation returns
Line 5:    // code here to create empty functions on the PMS's image object
for all the event handlers (e.g., onLoad, etc.) listed in "eventHandlers" in
Line 3 so that these event handler methods can be monitored and
controlled
Line 6: setInterval( function( ) {
Line 7:    for ( p in THIS ) {   if ( (THIS[p] !== image[p]) &&
(THIS[p] !== undefined) && !(p in excludeMethods)) { try { if ( p ===
'src') {
Line 8: //code for monitoring and regulating the image element's src
attribute
Line 9: } image[p] = THIS[p]; THIS[p] = image[p]; . . .
```

Referring to Line 0 in this example, a new function has been created that passes Javascript's global scope (i.e., "window") into the function. In Line 1, the original image constructor function is stored into the variable "ImageRef," then the constructor function for the image element is overridden. (See FIG. 6, ref. 602). The "a" and "b" input parameters may optionally provide the width and height, respectively, of the image. In Line 2, the private "THIS" variable indicates which eventHandlers should be monitored and which methods on the image element/object may be excluded.

Referring to Line 3 of the sample code in this example, although the ImageRef( ) method is called with two input parameters, conditional code (e.g., if-else statements) may be included to optionally call the ImageRef( )method with either one input parameter or no input parameters. Such conditional code may be useful to, among other things, when less than the two optional input parameters are desired. In Line 4, a "for" loop may be used to copy all of the properties of the original image element/object to the object created by the wrapper. (See FIG. 6, ref 604). In Line 5, the eventhandlers are setup in the wrapper for monitoring. In Line 6, a function is defined that will be repeatedly executed at a regular interval. (See FIG. 6, ref 606). In this case, the pseudo-code omits the end bracket ("}") for the setInterval( ) and that the call accepts the quantity of time (e.g., 50 ms) for each interval.

In Line 7, the code inspects those attributes of the image that are of interest to the PMS. (See FIG. 6, ref. 608). In particular, in line 8, if the attribute being analyzed is the "src" attribute of the image object, then the PMS may react according to privacy rules. For example, as explained above with respect to Line 2 of the appendChild( ) pseudo-code example, the value of the "src" attribute may be checked (e.g., compared) against a whitelist and/or blacklist, as well as other possible actions/rules. (See FIG. 6, ref 608). If the PMS determines that no privacy violation would occur, then the actual synchronization of the predefined object (e.g., image object 514) and the corresponding overridden object (e.g., wrapper image object 512) occurs in Line 9. (See FIG. 6, refs. 612 & 614).

One of ordinary skill in the art after review of the entirety disclosed herein will appreciate that the lines of pseudo-code presented above are merely a paraphrasing of the code and/or functionality achieved by the code. One or more lines of code may have been omitted in presenting the simplified example above.

Identifying the Third Party Culprit Behind the Fourth Party Access.

Referring to the example above with respect to monitoring the image element, Line 2 may also include a call to a logStack( ) function (or comparable function) to determine what specific Javascript code attempted to create an image element/object or update the "src" attribute of an image element. Such information may allow a CPO to identify which third party script is responsible for the data being sent, in addition to identifying what the data being sent out is. In some embodiments, the logStack( ) function operates by creating an "Error" type object and stripping data from it. The "Error" object may contain a stack trace that includes information about where the call to create or modify an image element/object originated from. While this function may be used in some embodiments in accordance with the disclosure, it may be omitted in some embodiments where browser-specific limitations may prevent proper access to the "Error" object. The PMS may, in some examples, identify the vendor responsible for the privacy policy violation on the CPO dashboard, in addition to displaying other information. This disclosure also contemplates a stack trace (or comparable log) being captured in other ways. For example, the "arguments.caller" properties or "Function.caller" properties within a logStack method (or comparable function) may be examined in lieu of, or in addition to, examining an Error object as described above.

Figure 4A:
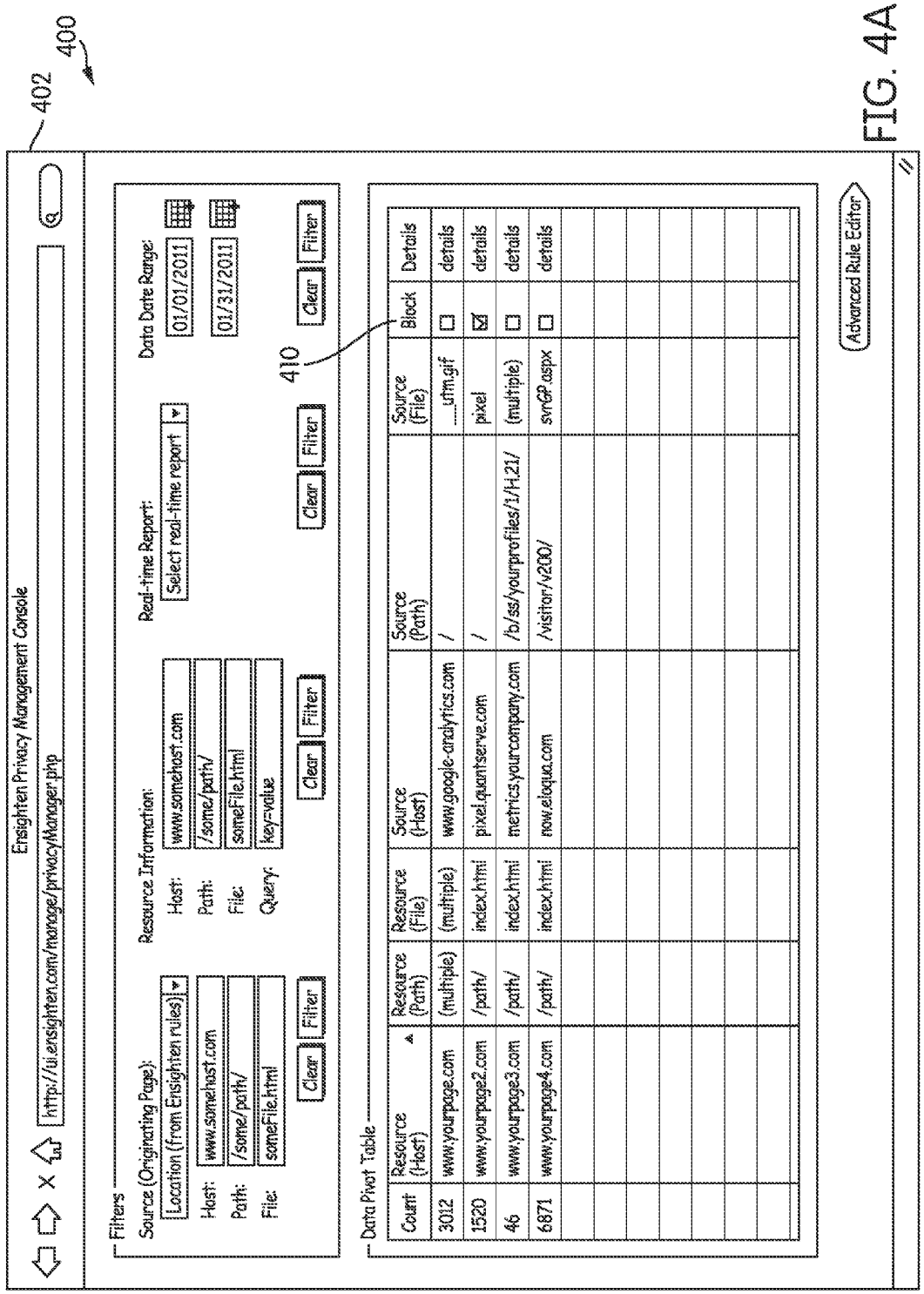
FIG. 4 (based on, inter alia, Appendix B in U.S. Provisional Application Ser. No. 61/428,560) illustrates an exemplary graphical user interface for a privacy management console and an advanced rule editor, in accordance with various aspects of the disclosure.
Figure 4B:
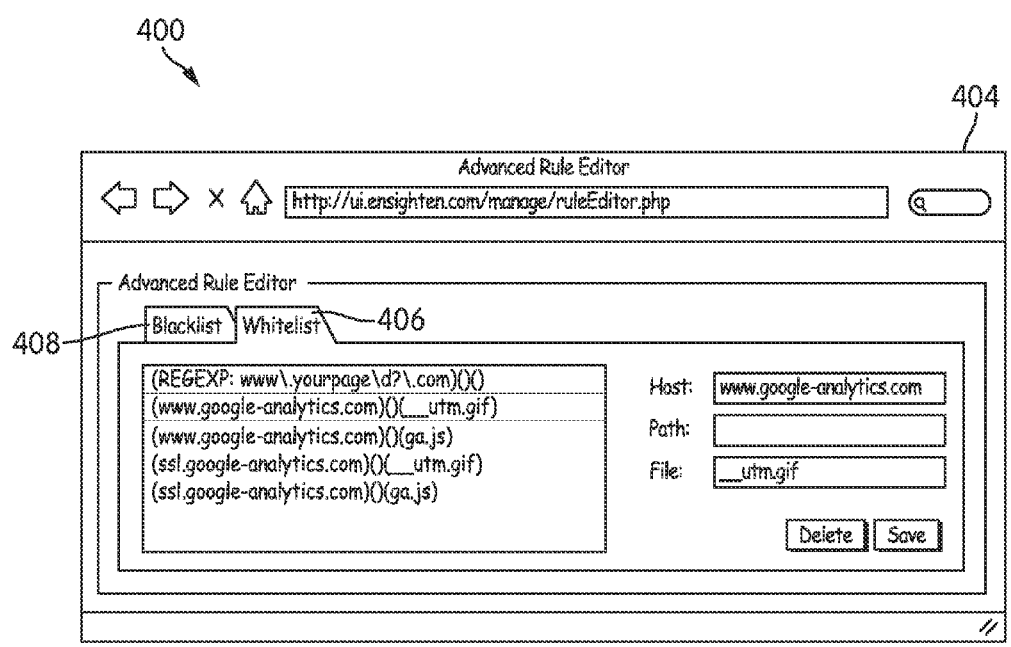

Chief Privacy Officer's Dashboard. FIG. 4 is an illustrative graphical user interface 400 for a CPO dashboard. Aspects of the dashboard 404 allows the creation of privacy rules for authorizing or blocking direct access to the analytics data collected from a webpage. For example, the CPO dashboard may allow a CPO (or other user) to create privacy rules that cause a PMS to block particular types of collected visitor data from being sent to vendors based on the location of the visitor, whether the user terminal is a mobile or stationary terminal, or other parameter. For example, foreign (e.g., Germany) privacy regulations may require that no (or none of a particular type of) visitor data be sent to vendors. The CPO dashboard may configure 410 the PMS to detect the location of a website visitor (e.g., by reverse geocoding the visitor's IP address to identify the visitor's location) and to subsequently block any attempts to transmit data collected about the user to particular vendors (e.g., third party vendors, fourth party vendors, etc.) One of skill in the art will appreciate after review of the entirety disclosed herein that numerous other information and features may be displayed/available on the CPO dashboard. For example, the CPO dashboard 402 may display the attribute name and value of the name-value parameters of image "src" attributes. This may assist CPOs in determining what types of data are being collected and sent about visitors of their webpages. At least one technical advantage of the prior example is that a single PMS, in accordance with various aspects of the disclosure, may be used for all worldwide visitors and adjust based on various parameters, such as the location of the website visitor and the privacy regulations specific to that location. Moreover, the PMS may be adjusted based other parameters and features apparent to one of skill in the art after review of the entirety disclosed herein, including any materials (e.g., an information disclosure statement) submitted concurrent with the filing of this disclosure.

CPO Dashboard's ON/OFF Monitoring Switch. In addition, in some embodiments in accordance with the disclosure, the CPO dashboard may include an input means (e.g., graphical ON/OFF switch) to allow the CPO to toggle (e.g., turn off, turn on, turn partially on) the state of the PMS functionality if website performance is desired at the expense of realtime online privacy management. In response to the input means, a variable (e.g., a Boolean-type variable) in the Javascript code may be updated to activate or deactivate the PMS code. As such, when the switch is in the OFF position, the webpages may be rendered without interaction/analysis by the PMS Javascript code. The state of the input means (e.g., OFF, ON, partially ON, etc.) may be sent to a remote sever for storage and easy retrieval at a later time.

Figure 3:
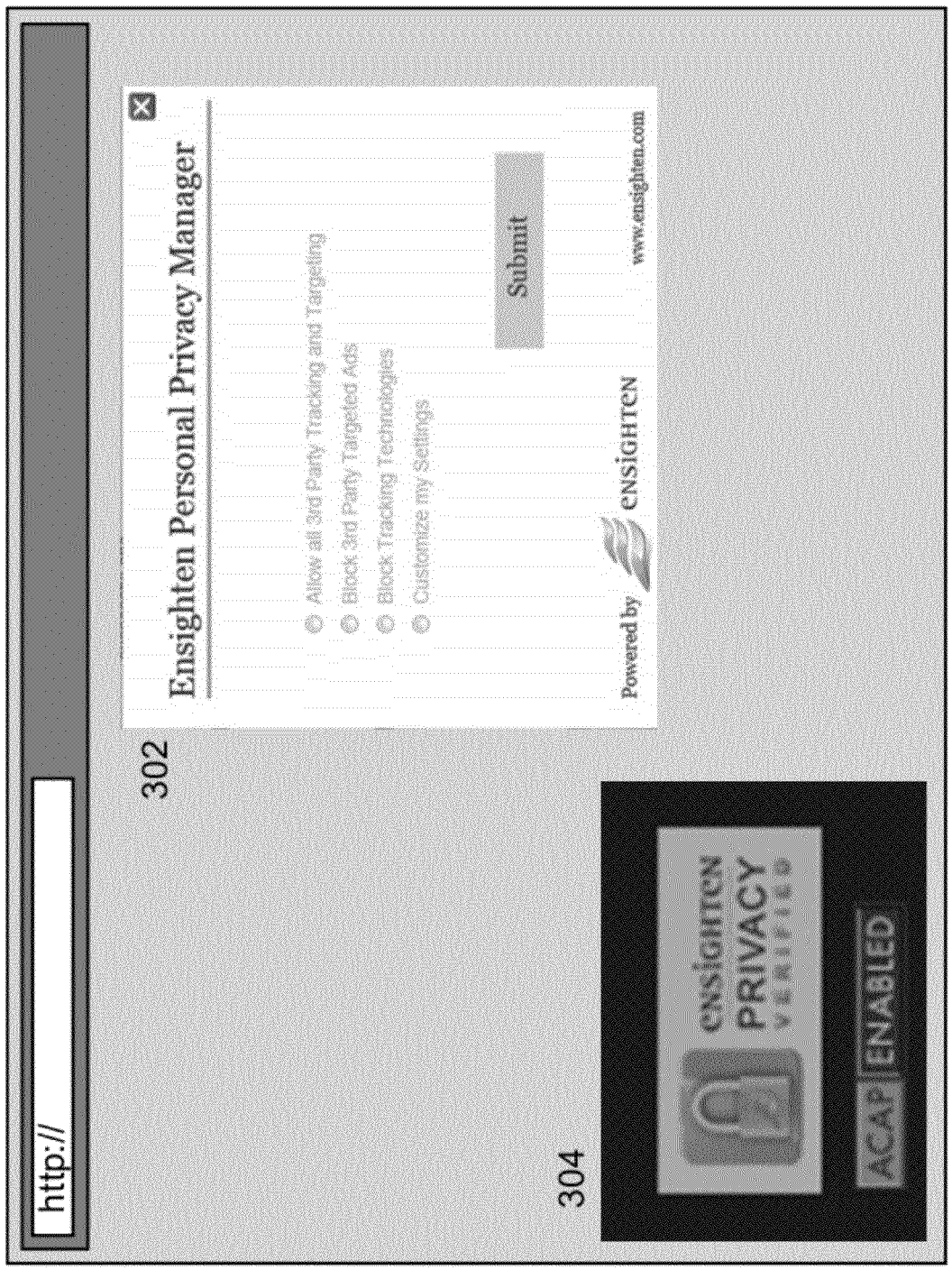
FIG. 3 is an illustrative graphical user interface showing a PMS-certified verification icon and privacy manager interface in accordance with various aspects of the disclosure.

PMS-Certified Verification. FIG. 3 illustrates a web browser displaying a webpage (omitted) that is has received certification from a PMS that the webpage/website complies with privacy policies. For example, icon 304 illustrates an icon that may appear on a webpage 502 to indicate to visitors to the webpage that the webpage has been verified (e.g., PMS-certified verification) and is being monitored using a PMS, which in some embodiments may be in accordance with various aspects of the disclosure. The graphical icon 304 may be selectable and upon its selection may display a dialog box 302. The dialog box 302 may permit a visitor to further customize his/her privacy settings/preferences. For example, the user can opt out of tracking and targeted ads completed (e.g., a user, upon verification of age, may be opted out of particular types (or even all) tracking pursuant to child privacy laws because the user is a child under a particular age.) Upon selection of a setting, the user's preferences may be transmitted to a remote server (e.g., Ensighten's application server 506) to be saved and associated with the user. The association may be created using browser-side cookies. For example, a browser-side cookie may be saved on the visitor's device 100 with information that permits the PMS to automatically detect the user's preference on future visits.

Companies may sign up with a PMS for monitoring and control of their analytics data collection and distribution. As a result, the icon 304 may be displayed on the company's webpages 502. Moreover, through the PMS client-browser scripting code (e.g., Javascript code) the PMS may detect and read cookies Internet-wide. For example, when visiting different websites, the PMS may be able to use the cookie-based approach to automatically implement the user's preference on all sites (e.g., once a user is verified as being under a particular age, the user's cookie settings may assist in automatically opted the user out of tracking and other activities on other websites.) One skilled in the art will appreciate after review of the entirety disclosed herein that numerous derivations of the base concept disclosed are contemplated. For example, the icon 304 may be displayed in different colors to indicate different levels of privacy management. The icon may be displayed primarily in red to indicate that the website operates under a privacy setting outside the threshold of comfort previously designated by the user. Meanwhile, the icon may be displayed primarily in green to indicate that privacy controls are commensurate with the user's preferences. In addition, a dashboard similar to the CPO dashboard may be made available to the user through selection of the icon 304. As such, the user may be able to identify and understand what aspects of their online experience are being monitored and where that information is being sent.

Additional Features. The PMS contemplated by this disclosure includes code in the Javascript language, but one of ordinary skill in the art after review of the entirety disclosed herein will appreciate that code written in other programming languages may be used in addition to or in lieu of Javascript. Numerous detailed examples in the disclosure have used Javascript merely as an example of a scripting language that allows dynamic update of the elements on a webpage and function overriding capabilities. The disclosure contemplates that Javascript may be one day deprecated in favor of another client-side (and server-side) scripting languages, and the disclosed PMS is not so limited. One of ordinary skill in the art will appreciate that Javascript may be substituted with other programming languages and technologies (e.g., DHTML 5.0 and canvas/video elements). In one example, Adobe Flash™ (formerly Macromedia Flash) objects embedded in a webpage may be dynamically manipulated using ActionScript™, a language similar to Javascript in that it also is based on the ECMAScript standard. This disclosure contemplates embodiments where Flash objects may be monitored using techniques that would be apparent to one of skill in the art after review of the entirety disclosed herein. For example, image resources, picture objects, and button objects may have methods overridden or inherited to provide for similar functionality as described herein. Similarly, other non-Javascript technologies, such as Silverlight™ may also be used in accordance with various aspects of the disclosure.

In addition, various aspects of the examples illustrated herein take advantage of the current version of Javascript and the capabilities it provides. For example, the Javascript specification currently does not permit overriding of the "setter" method of the "src" attribute of the HTML image element. If future versions of Javascript provide the ability to override the aforementioned method, one of skill in the art will appreciate after review of the entirety disclosed herein that appropriate adjustment to disclosed PMS features is contemplated by the disclosure. For example, the polling that is currently disclosed for monitoring the attributes of the image element/object may be replaced by an overriding method. Alternatively, if a value change notification feature becomes available in Javascript for the particular element, this disclosure contemplates that this feature may be used in lieu of (or in conjunction with) the polling technique currently described in one embodiment.

Furthermore, current web analytics technologies use image elements to transmit collected data from a user's device to a remote server. However, this disclosure contemplates other techniques for transferring collected data (e.g., analytics data) to a remote server. For example, Websockets™ may be used to create an open direct TCP/IP connection to a remote server to transmit analytics data. One skilled in the art will appreciate after review of the entirety disclosed herein that the PMS may override the method responsible for creation (e.g., adding, modifying, updating, and/or regulating) of Websockets and apply the principles disclosed herein accordingly.

Aspects of the disclosure are described herein in terms of illustrative embodiments thereof. Numerous other embodiments, modifications and variations within the scope and spirit of the recited disclosure will occur to persons of ordinary skill in the art from a review of this disclosure. For example, one of ordinary skill in the art will appreciate that the steps illustrated in the illustrative figures and described herein may be performed in other than the recited order, and that one or more illustrative steps may be optional in accordance with aspects of the invention.

We claim:

1. A method of controlling distribution of web analytic data using an online privacy management system, the method comprising:

receiving a page from a remote server corresponding to a first domain, wherein the page comprises at least a plurality of elements that cause a computer processor to send data to a domain different from the first domain;

processing, using the computer processor, a first element of the plurality of elements of the page, wherein the first element stores a first uniform resource locator referencing a privacy management system server storing scripting code for privacy management;
sending, using the computer processor, a request to the privacy management system server for the scripting code for privacy management;
executing, using the computer processor, the scripting code for privacy management to at least define an overridden object, wherein the overridden object is a wrapper object overriding a predefined object;
processing, using the computer processor, a second element of the plurality of elements after the executing of the scripting code for privacy management, wherein the second element is configured to cause creation of the predefined object configured to send data to a domain different from the first domain and different from the privacy management system server;
creating, in a computer memory using the computer processor, the overridden object instead of the predefined object corresponding to the second element, wherein the overridden object is configured to store at least an uniform resource locator;
storing in the overridden object a second uniform resource locator received from the second element, wherein the second uniform resource locator corresponds to a second domain;
creating, in the computer memory using the computer processor, the predefined object, wherein the predefined object is configured to store at least an uniform resource locator;
causing, by the scripting code for privacy management, the computer processor to check for updates to the uniform resource locator stored in the overridden object;
in response to determining that the uniform resource locator of the overridden object has been updated to the second uniform resource locator, comparing, by the scripting code for privacy management, the second uniform resource locator stored in the overridden object to a predetermined list of domains;
in response to determining that the second uniform resource locator stored in the overridden object is in the predetermined list, blocking, by the scripting code for privacy management, the second element from configuring the page to send collected data to the second uniform resource locator, wherein the collected data comprises web analytic data; and
in response to determining that the second uniform resource locator stored in the overridden object is not in the predetermined list, updating, by the scripting code for privacy management, the uniform resource locator stored in the predefined object to the second uniform resource locator.

2. The method of claim 1, wherein the first element is a script tag in hypertext markup language, wherein the predefined object corresponds to an image element in hypertext markup language, wherein the page is a dynamically generated webpage organized as a document object model, wherein the scripting code is written in a programming language that lacks functionality to override a setter function of a variable corresponding to the uniform resource locator stored in a predefined object, and wherein the scripting code includes at least one of: JavaScript code for web analytics, JavaScript code for advertisement management, and scripting code for collecting data about users.

3. The method of claim 1, wherein the executing the scripting code for privacy management further comprises defining an overridden method overriding a predefined method, the method further comprising:
processing, using the computer processor, a third element of the plurality of elements after the executing of the scripting code for privacy management, wherein the third element is configured to cause the execution of the predefined method;
receiving a third uniform resource locator corresponding to a third domain, wherein the third uniform resource locator is an input parameter to the predefined method, and wherein the third domain is different from the first domain and different from the privacy management system server;
executing the overridden method instead of the predefined method corresponding to a third element;
comparing, by the scripting code for privacy management, the third uniform resource locator to the predetermined list of domains; and
in response to determining that the third uniform stored is in the predetermined list, blocking, by the scripting code for privacy management, the third element from configuring the page to send collected data to the third uniform resource locator.

4. The method of claim 3, wherein the page is a webpage organized as a document object model, and wherein the predefined method is at least one of: an appendChild function, an insertBefore function, a replaceChild function, and a write function.

5. The method of claim 1, wherein the blocking is performed in realtime and comprises:
modifying the second uniform resource locator to clear the collected data; and
storing the modified second uniform resource locator in the predefined object.

6. The method of claim 1, wherein the computer processor checks for updates to the second uniform resource locator of the overridden object on a predetermined interval, and not using a push model.

7. The method of claim 1, wherein the second element is a script tag in hypertext markup language and includes a fourth uniform resource locator, the method further comprising:
causing, by the second element, an update of the second uniform resource locator stored in the overridden object to the fourth uniform resource locator, wherein the fourth uniform resource locator is in the predetermined list of domains;
recording in a log the second uniform resource locator that corresponds to the second domain; and
recording in the log in association with the second uniform resource locator, at least the fourth uniform resource locator.

8. The method of claim 7, wherein the two steps of recording in the log include reading a stack trace using the computer processor to obtain information for the log file.

9. A computer-readable non-transitory medium storing computer-executable instructions, which when executed by a processor of a remote computing device, cause the remote computing device to:
define an overridden object, wherein the overridden object is a wrapper object overriding a predefined object, wherein the overridden object is configured to store at least an uniform resource locator, wherein the predefined object is configured to store at least an uniform resource locator; and wherein the defining an overridden object configures the processor to create, in a memory, the overridden object instead of the predefined object in response to a request to create the predefined object;
create, in the memory, the predefined object, wherein the predefined object is associated with the overridden object;
cause the processor to check for updates to the uniform resource locator stored in the overridden object;
compare the updated uniform resource locator stored in the overridden object to a predetermined list of domains, in response to determining that the uniform resource locator of the overridden object has been updated;
based on results of the comparing, perform one of:
(i) modify the updated uniform resource locator stored in the overridden object to remove collected data and store the modified updated uniform resource locator in the predefined object; and
(ii) store the updated uniform resource locator in the predefined object;
generate a graphical user interface comprising an input means configured to enable scripting code for privacy management;
send a state of the input means to the privacy management server for storage;
before the defining of the overridden object, determine that the scripting code for privacy management is disabled;
reconfigure the processor to no longer create the overridden object instead of the predefined object in response to a request to create the predefined object; and
reconfigure the processor to no longer cause the processor to check for updates to the uniform resource locator stored in the overridden object.

10. The computer-readable medium of claim 9, wherein the predetermined list of domains is a blacklist, and (ii) is performed based on the comparing when the updated uniform resource locator is not part of the blacklist, and further storing computer-executable instructions, which when executed by the processor, cause the remote computing device to:
display a list of one or more domains providing third-party scripting code to the remote computing device, wherein the third-party scripting code is configured to cause the remote computing device to send the collected data to a remote server;
determine that the remote server is associated with a domain on the blacklist; and
display the domain on the blacklist that corresponds to the domain providing third-party scripting code; and
display whether the processor of the remote computing device is configured to block execution of the third-party scripting code.

11. A computer-readable non-transitory medium storing computer-executable instructions, which when executed by a processor of a remote computing device, cause the remote computing device to:
define an overridden object, wherein the overridden object is a wrapper object overriding a predefined object, wherein the overridden object is configured to store at least an uniform resource locator, wherein the predefined object is configured to store at least an uniform resource locator; and wherein the defining an overridden object configures the processor to create, in a memory, the overridden object instead of the predefined object in response to a request to create the predefined object;
create, in the memory, the predefined object, wherein the predefined object is associated with the overridden object;
cause the processor to check for updates to the uniform resource locator stored in the overridden object;
compare the updated uniform resource locator stored in the overridden object to a predetermined list of domains, in response to determining that the uniform resource locator of the overridden object has been updated;
based on results of the comparing, perform one of:
(i) modify the updated uniform resource locator stored in the overridden object to remove collected data and store the modified updated uniform resource locator in the predefined object; and
(ii) store the updated uniform resource locator in the predefined object;
determine a location of the remote computing device;
identify a privacy rule corresponding to the location of the remote computing device; and
configure the processor to block sending of the collected data when the privacy rule has been met.

12. A computer-readable non-transitory medium storing computer-executable instructions, which when executed by a processor of a remote computing device, cause the remote computing device to:
define an overridden object, wherein the overridden object is a wrapper object overriding a predefined object, wherein the overridden object is configured to store at least an uniform resource locator, wherein the predefined object is configured to store at least an uniform resource locator; and wherein the defining an overridden object configures the processor to create, in a memory, the overridden object instead of the predefined object in response to a request to create the predefined object;
create, in the memory, the predefined object, wherein the predefined object is associated with the overridden object;
cause the processor to check for updates to the uniform resource locator stored in the overridden object;
compare the updated uniform resource locator stored in the overridden object to a predetermined list of domains, in response to determining that the uniform resource locator of the overridden object has been updated;
based on results of the comparing, perform one of:
(i) modify the updated uniform resource locator stored in the overridden object to remove collected data and store the modified updated uniform resource locator in the predefined object; and
(ii) store the updated uniform resource locator in the predefined object;
define an overridden method overriding a predefined method, wherein the defining an overridden method configures the processor to execute, by the processor, the overridden method instead of the predefined method in response to a request to execute the predefined method;
cause the processor to execute the predefined method subsequent to execution of the overridden method;
receive an uniform resource locator corresponding to a third domain as an input parameter to the predefined method, and wherein the third domain is different from a domain corresponding to the privacy management system server;
compare the received uniform resource locator to the predetermined list of domains; and
in response to determining that the received uniform resource locator stored is in the predetermined list, modify the uniform resource locator stored to remove the collected data.

13. The computer-readable medium of claim 12, wherein the causing the processor to execute the predefined method further comprises:
using the modified uniform resource locator as the input parameter to the predefined method.

14. The computer-readable medium of claim 12, wherein the predefined method is a constructor method corresponding to an image element in hypertext markup language, and wherein the predefined method is at least one of: an appendChild function, an insertBefore function, a replaceChild function, and a write function.

* * * * *